(12) United States Patent
Frieh et al.

(10) Patent No.: US 9,467,381 B2
(45) Date of Patent: Oct. 11, 2016

(54) CHOICE OF INITIALIZATION TECHNIQUE FOR LOAD BALANCING ATTEMPTS

(71) Applicant: ARRIS Enterprises, Inc., Suwanee, GA (US)

(72) Inventors: Dwain E. Frieh, Oswego, IL (US); Tom Michaels, Lisle, IL (US)

(73) Assignee: ARRIS Enterprises, Inc., Suwanee, GA (US)

(*) Notice: Subject to any disclaimer, the term of this patent is extended or adjusted under 35 U.S.C. 154(b) by 262 days.

(21) Appl. No.: 14/142,231

(22) Filed: Dec. 27, 2013

(65) Prior Publication Data
US 2015/0188822 A1 Jul. 2, 2015

(51) Int. Cl.
| | |
|---|---|
| *H04L 12/803* | (2013.01) |
| *H04L 29/12* | (2006.01) |
| *H04L 12/741* | (2013.01) |
| *H04B 3/02* | (2006.01) |
| *H04L 12/707* | (2013.01) |
| *H04L 12/28* | (2006.01) |
| *H04N 21/426* | (2011.01) |
| *H04N 21/61* | (2011.01) |

(52) U.S. Cl.
CPC .............. *H04L 47/125* (2013.01); *H04B 3/02* (2013.01); *H04L 12/2801* (2013.01); *H04L 45/22* (2013.01); *H04L 45/54* (2013.01); *H04L 61/103* (2013.01); *H04N 21/42676* (2013.01); *H04N 21/6118* (2013.01)

(58) Field of Classification Search
CPC .............................. H04L 47/00; H04W 76/00
USPC .......................................................... 370/235
See application file for complete search history.

(56) References Cited

U.S. PATENT DOCUMENTS

| | | | | |
|---|---|---|---|---|
| 2006/0120282 | A1* | 6/2006 | Carlson | H04L 12/2602 370/229 |
| 2009/0125959 | A1* | 5/2009 | Oh | H04N 21/4383 725/111 |
| 2012/0084416 | A1* | 4/2012 | Thibeault | H04L 12/2801 709/222 |
| 2012/0251113 | A1* | 10/2012 | Hajduczenia | H04L 41/082 398/66 |

OTHER PUBLICATIONS

PCT Search Report & Written Opinion, RE: Application No. PCT/US2014/068819, dated Mar. 23, 2015.
"Load Balancing, Dynamic Channel Change, and Dynamic Bonding Change on the Cisco CMTS Routers", Feb. 14, 2008, retrieved from the Internet at URL <http://www.cisco.com/c/en/us/td/docs/cable/cmts/config_guide/b_cmts_ds_us_features/b_cmts_ds_us_features_chapter_01010.pdf> on Mar. 13, 2015, 62 pgs.
Data-Over-Cable Service Interface Specifications: DOCSIS 3.0 MAC and Upper Layer Protocols Interface Specification; document ID: CM-SP-MULPlv3.0-I18-120329; CableLabs, Mar. 29, 2012.
Data-Over-Cable Service Interface Specifications: Operations Support System Interface Specification; document ID: CM-SP-OSSIv3.0-I18-120329; CableLabs, Mar. 29, 2012.

* cited by examiner

*Primary Examiner* — Ian N Moore
*Assistant Examiner* — Mewale Ambaye
(74) *Attorney, Agent, or Firm* — Lori Anne D. Swanson

(57) ABSTRACT

A cable network facilitates communication between a CMTS and cable modems over a plurality of channels. The Data Over Cable Service Interface Specification (DOCSIS) protocol access system for load balancing in a cable network transmits a change request directing movement of a cable modem to a different channel. The change request indicates an initialization technique for the cable modem to perform once synchronized to the different channel(s). If the cable modem is not successfully initialized on the different channel or channel set, the CMTS is configured to iteratively transmit subsequent retry requests. The subsequent retry requests may indicate an initialization technique based on a list of initialization techniques.

20 Claims, 4 Drawing Sheets

CHOICE OF INITIALIZATION TECHNIQUE FOR LOAD BALANCING ATTEMPTS

BACKGROUND

Load balancing cable modems in a cable network system maximizes bandwidth and usage of a cable plant. A load balancing feature in a cable modem termination system (CMTS) allows a system to distribute cable modems across radio frequency (RF) downstream and upstream channels on the same cable interface card or across different cable interface cards in the system. Load balancing is enhanced and supported by allowing cable modems to be moved to different channels using dynamic channel change (DCC) or dynamic bonding change (DBC) using configurable initialization techniques.

To effectuate load balancing, DCC/DBC requests used in Data Over Cable Service Interface Specification (DOCSIS) implementations may dynamically change cable modem upstream or downstream channels without forcing a cable modem to go offline and without re-registration after the change. In some cases, such as re-initialization scenarios, the cable modem will go offline and re-register. A DCC/DBC request may be transmitted by a CMTS to cause a cable modem (CM) to change the upstream channel(s) on which it is transmitting, the downstream channel(s) on which it is receiving, or both. The DCC/DBC can be done to move a cable modem that is physically connected to both source and target upstream or downstream channels, or both.

If initialization due to a DCC or DBC request fails a certain number of times for a cable modem, the cable modem may be removed from the load balancing group. Better techniques for handling cable modem channel or bonding change requests specifying initialization techniques are desirable, particularly where the cable modem fails the initialization.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Figure 1:
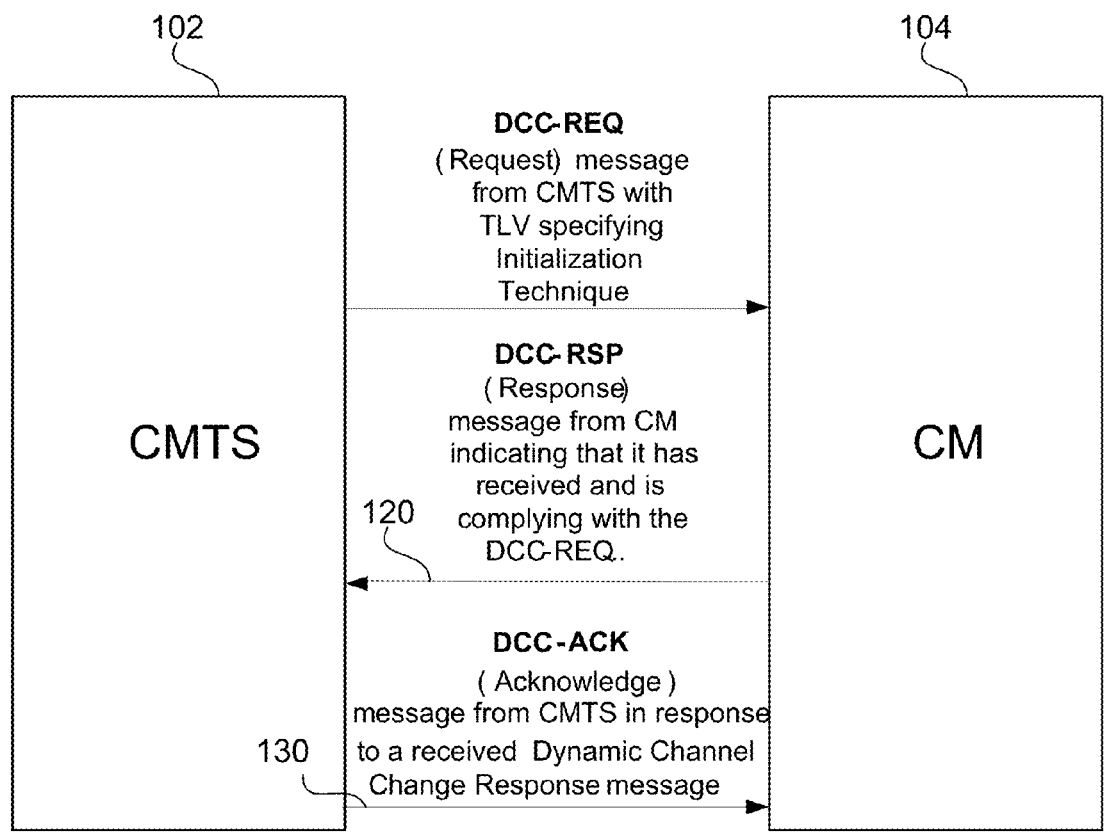
FIG. 1 depicts example messaging traffic between a cable modem termination system (CMTS) and cable modem for Data Over Cable Service Interface Specification (DOCSIS)-defined initialization techniques.

It is noted that while the accompanying FIGS. serve to illustrate embodiments of concepts that include the claimed invention, and explain various principles and advantages of those embodiments, the concepts displayed are not necessary to understand the embodiments of the present invention, as the details depicted in the FIGS. would be readily apparent to those of ordinary skill in the art having the benefit of the description herein.

DETAILED DESCRIPTION

Load balancing, in general, prevents any given downstream and/or upstream channel(s) from becoming overburdened so long as excess capacity is available on other reachable channel(s). The Data Over Cable Service Interface Specification (DOCSIS) 3.0 MULPI and PHY specifications include functionality defining dynamic load balancing of cable modems across downstream and upstream channels. As described in more detail below, one of the mechanisms enabling load balancing is dynamic channel change (DCC) and consists of a set of messages passed between the cable modem termination system (CMTS) and a cable modem (CM). Included in the DCC request is an initialization technique that the CM attempts to perform once synchronized to the new channel(s). However, in existing systems, if the single initialization technique specified in the DCC request is not successful for a cable modem, there is no retry mechanism defined by the DOCSIS protocol. Thus, a cable modem may be prevented from becoming operational on a desired set of channels. Dynamic bonding change (DBC) requests may suffer from the same deficiencies, where DBC requests typically involve movement of cable modems between channel sets.

Disclosed herein are extensions to DOCSIS that may be implemented in the cable modem termination system (CMTS) which give the operator additional options for communicating desired initialization technique(s) to a cable modem. Embodiments are disclosed that enable the CMTS to implement retry mechanisms associated with a dynamic channel change (DCC) or dynamic bonding change (DBC) requests, such that cable modems are given access to more than one initialization technique. The disclosed techniques involve the CMTS directing the CM to first attempt to change channels (e.g., with a DCC or DBC request) and initialize using the specified initialization technique. If not successful, subsequent DCC/DBC attempt(s) are requested by the CMTS. By way of example, the DCC mechanism is discussed in more detail below, but it should be understood that the disclosed techniques also apply to DBC.

When load balancing, an attempt is made to efficiently distribute cable modems across the available channels. To facilitate the desired outcome for balancing the load, the DCC is a mechanism to initialize the move of a cable modem to a different downstream channel, upstream channel, or both. Load balancing may be a periodic evaluation of the loading across all channels to determine if there are any candidate cable modem(s) to be moved from heavily loaded channel(s) to more lightly loaded channel(s). The load balancing evaluation may take place dynamically or manually via commands.

FIG. 1 depicts example messaging traffic between a CMTS 102 and cable modem 104 for DOCSIS-defined initialization techniques. The DCC handshaking between the CMTS and cable modem generally includes three messages, the DCC REQ message 110, the DCC-RSP message 120, and the DCC-ACK message 130. The DCC mechanism specifies in the DCC-REQ message 110 an initialization technique. The initialization technique directs the cable modem to perform one of several types of initializations on itself once it synchronizes to the new channel(s). In DOCSIS, initialization techniques generally include one or more of the following:

Initialization Technique Zero (0)—"Reinitialize MAC"
Initialization Technique One (1)—"Broadcast Initial Ranging"
Initialization Technique Two (2)—"Unicast Initial Ranging"
Initialization Technique Three (3)—"Initial Ranging"
Initialization Technique Four (4)—"Direct"

During a successful initialization operation, in response to the DCC-REQ message 110, the cable modem issues a DCC-RSP message 120. The DCC-RSP message 120 indicates that the cable modem has received the DCC-REQ message 110. The DCC-RSP message 120 may indicate that the cable modem is complying with the specified initialization techniques. Multiple DCC-REQ messages 110 may be provided to the cable modem if the DCC-RSP message 120 is not returned. The CMTS 102 issues a DCC-ACK message 130 to the cable modem 104, acknowledging receipt of the DCC-RSP message 120.

In some cases (and for various reasons) the cable modem may not become fully operational on the new channel(s) after performing the initialization technique specified in the DCC-REQ message 110. Existing DOCSIS systems only accommodate a DCC operation that involves the CMTS conveying a single initialization technique to the CM. Thus, while the DCC-REQ may be provided more than once, the DCC-REQ message is configured with only enough bits to specify a single initialization technique and, if it fails for a particular cable modem, there is no retry mechanism with a different initialization technique. Thus, the result is that the cable modem does not become operational on the new channel, and an alternate initialization technique is not available to try. Rather, if the initialization technique specified in the DCC-REQ message 110 fails, the cable modem 104 may respond with a message indicating the failure or simply does not perform the channel change. The existing implementations in which a single choice of initialization technique is not optimum or may not be possible for the majority of cable modems.

Standard DOCSIS Management Information Base (MIB)s, text files that are generated to create objects recognizable and usable by a network for managing the network, may be generated to provide a capability to configure any one of multiple initialization techniques (e.g., unicast, net ranging, direct, etc.). However, the DOCSIS specifications do not define a mechanism whereby alternate configured initialization techniques would be employed or handled in subsequent retry DCC attempts.

Further, current DOCSIS limitations may be a result of an operator's choice of initialization technique to be included in the DCC-REQ message 110 to the cable modem. The operator's choice of initialization technique may or may not be an optimum technique or even a workable choice for the majority of cable modems. For example, if the operator chooses the least disruptive initialization technique ('Direct'), and the majority of the CMs in the pool cannot handle 'Direct', then a large portion of cable modems are not able to be load balanced with the DCC. On the other hand, if the operator chooses a more service disruptive initialization technique such as 'Broadcast Initial Ranging' then there may be many cable modems out of the pool that are capable of using 'Direct', but would be "penalized" by the other CMs' inability to use the 'Direct' technique.

As disclosed, the CMTS may iteratively attempt subsequent retry DCC requests. The retry DCC requests will specify an initialization technique that may be different (or the same) compared with the initialization technique from the original DCC. New MIB objects are defined to allow the choice of initialization techniques to be either statically configured by the operator or determined dynamically at the discretion of the CMTS. This concept and mechanism represents an extension to the functionality provided with DOCSIS 3.0.

Figure 2:
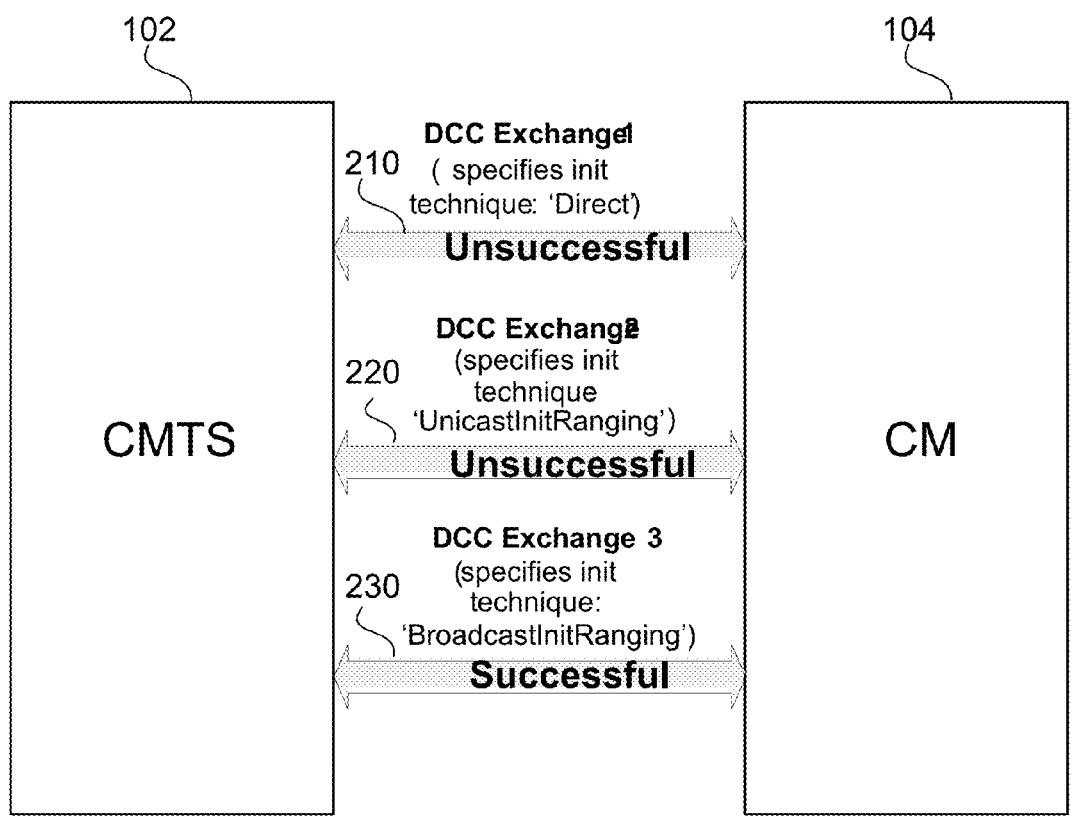
FIG. 2 depicts an example messaging sequence between a CMTS and a cable modem with multiple request messages.

FIG. 2 depicts an example of load balancing that involves the movement of a cable modem, under the control of the CMTS, from one downstream and/or upstream channel to another. In embodiments, the cable modems are moved between channels with the DOCSIS dynamic channel change (DCC) mechanism. As described above, a DCC operation may involve the sequence of messages passed between the CMTS and CM as depicted in FIG. 1. The CMTS initiates the sequence with the DCC-REQ message which specifies, among other items, the type of initialization technique that should be used by the CM. In embodiments, the cable modems are similarly moved between channels with the DOCSIS dynamic bonding change (DBC) mechanism with a sequence of DBC related messages, such as initializing with a DBC-REQ message, for example.

As described below, extensions to DOCSIS may be implemented in the CMTS which give the operator additional options for communicating desired initialization technique(s) to the cable modem. As disclosed, the CMTS directs the CM to first attempt to change channels (via, for example, DCC) and initialize using the specified initialization technique. Then, if not successful, subsequent DCC attempt(s) are requested by the CMTS using a different (or the same) initialization technique. As shown in FIG. 2, the CMTS and CM may exchange a series of messages depending on whether the initialization technique specified in a first DCC Exchange message is successful. For example, as shown, the DCC Exchange message 1, at 210, specifies a first initialization technique to attempt. In this example, the initialization technique specified is "Direct" and the cable modem is unsuccessful initializing using the Direct initialization technique. In response, the CM informs the CMTS that the initialization was not successful.

However, instead of repeating the same DCC, disclosed are techniques for extensions to DOCSIS that may be implemented in the CMTS which give the operator additional options for communicating desired initialization technique(s) to the cable modem.

DOCSIS specifications define MIB objects for configuring the parameters (including initialization technique) of general load balance groups. For example, an instance of docsLoadbal3GeneralGrpCfgTable is created by the CMTS whenever a fiber node is associated to a particular media access control (MAC) Domain. The object is populated with default values from the docsLoadbal3GeneralGrpDefaults object. In a similar manner, when a fiber node is no longer associated with a MAC Domain the corresponding docsLoadbal3GeneralGrpCfgTable instance is deleted. Note that although instances of docsLoadbal3GeneralGrpCfgTable are created automatically by the CMTS using default parameters from the docsLoadbal3GeneralGrpDefaults object, an operator may subsequently change the parameter settings to values different from the defaults.

As disclosed, a MIB object is configurable to accommodate for cable modem initialization failures. For example, existing initialization technique MIB parameters (e.g., docsLoadbal3GeneralGrpDefaultsInitTech) are defined in DOCSIS as a bitmap with each bit specifying a particular technique. An empty value or a value with all bits in '0' means no channel changes allowed. The DOCSIS-defined bit numbering is as follows:

reinitializeMac(bit 0)
broadcastInitRanging(bit 1)
unicastInitRanging(bit 2)
initRanging(bit 3)
direct(bit 4)

In disclosed embodiments, the operator configures the standard DOCSIS MIBs (e.g. docsLoadbal3GeneralGrp DefaultsInitTech) with desired single or multiple bits set. Extending further to conventional DOCSIS techniques, new control MIB objects (examples described in more detail below) are implemented. In embodiments, the extended MIB objects are designed to allow the operator to define a set of initialization techniques and their explicit ordering for use in DCC/DBC attempts. One example would implement new MIB objects to represent the order precedence of DCC/DBC attempts (first, second, third, etc.) with an associated initialization technique configured for each by the operator. An example implementation would assign an identifying unique integer value to each possible initialization technique for use in configuring the above order precedence MIB objects. In embodiments, the extended MIB objects enable the CMTS itself to alternatively, automatically determine the best initialization techniques to specify for DCC/DBC attempts. In embodiments, an operator manually configures the CMTS to identify the initialization scheme implemented in case of cable modem initialization failures.

Thus, as shown in FIG. 2, upon an unsuccessful result from DCC Exchange message 1 at 210, a second DCC Exchange occurs between the CMTS and the CM, DCC Exchange message 2, at 220. In the DCC Exchange message 2, the example initialization technique specified is "Unicast init ranging." The second technique may be based on an ordering, as described above. Again, in this example, the cable modem responds with an indication that the initialization was not successful. A third DCC Exchange occurs between the CMTS and the CM, DCC Exchange message 3, at 230. In the DCC Exchange message 3, the initialization technique specified is "Broadcast init ranging." As shown by this example, the cable modem successfully initializes based on the broadcast init ranging technique and informs the CMTS of the same.

In an example scenario, the CMTS becomes aware of an unsuccessful DCC transaction in one of two ways. In some cases, the CM may send the CMTS a DCC Response (DCC-RSP) message indicating a failure/reject. In other cases, the CM goes through the motions of moving to a different channel(s) and does not send a failure reason with the DCC-RSP; thus, the channel change never takes place. In the latter cases, the CMTS eventually detects that the CM never moved to the set of channel(s) directed in the last DCC-REQ and stores an indicator of the failure in its records.

The disclosed functionality may lead to the greatest number of CMs that are load balanced using the least disruptive initialization technique. For example, in DOCSIS 3.0, the initialization techniques may cause some delay or packet loss to the system. A complete re-initialization of a cable modem may result in the most packet loss. The least impactful initialization technique is referred to as a 'Direct' DCC initialization technique. Using the disclosed functionality, the DCC request may begin with a Direct initialization request, which is successful for those cable modems capable of performing the Direct initialization request.

However, not all cable modems or network components to the cable modem are capable of successfully initializing using the Direct Initialization techniques. Thus, a second initialization approach defined by a static ordering approach may provide a backup option for those cable modems that do not successfully perform the first initialization technique specified in the DCC-REQ message. The CMTS can message with the cable modem in an iterative manner, working through the ordered list of initialization techniques. Thus, at the same time, the disclosed techniques can create a larger pool of CMs that are capable of being moved for load balancing purposes with DCC. For instance, the CMTS may progress to requesting a different initialization technique with a DCC retry if the CM is unable to use the 'Direct' technique.

The CMTS may progress to the different initialization technique based on a predefined ordering. In embodiments, the ordering may repeat previously attempted initialization techniques. The ordering may include repeated and different initialization techniques. As described in more detail below, there are many reasons behind the ordering of the initialization techniques through which the CMTS may progress in the DCC/DBC requests. For example, as described above, the ordering may be in an order of least disruptive initialization techniques to most disruptive initialization techniques. In embodiments, knowledge by the operator that the majority of cable modems hosted by the CMTS chassis or a particular MAC Domain Initialize more reliably perform certain initialization techniques may influence the predefined order. Below are many discussions of such ordering for use with the disclosed techniques. Further, the disclosed ordering for DCC/DBC requested initialization techniques may be used in combination with existing DCC requests. For example, a current solution for DCC requests may be attempted first before switching to the disclosed ordering techniques.

It should be noted that in the embodiments disclosed herein, the set of downstream and upstream channels that a CM can be moved between are members of a load balancing group. Types of load balancing groups include general load balancing groups and restricted load balancing groups. For example, general load balancing groups are automatically created by the CMTS and are comprised of channels that are all members of the same MAC domain cable modem service group (MD-CM-SG). General load balancing groups also contain parameters specifying the initialization technique that should be specified in DCC operations for load balancing operations for CMs in that group. Note that while examples are provided for dynamic load balancing with general load balancing groups, it should be understood that the retry mechanisms and increased initialization functionality disclosed herein apply to other forms of load balancing, such as those involving restricted load balancing groups, as well as manual load balancing.

The following are example MIB control objects defined to implement the disclosed techniques. It is noted that the actual implementation may vary based on what basis the MIBs control objects are configurable (e.g. global system basis versus per MAC Domain basis, etc.). For example, the options for setting up the progressive initialization technique may be implementation-specific and provide either more or less granularity.

LoadBalGeneralGrpInitTechOrder MIB control object:
 An explicit/static ordering of DCC initialization techniques that the CMTS will use in its DCC or DBC attempts. That is, the CMTS will choose the initialization technique to use for DCC or DBC attempts starting with the initialization technique configured as the first, and if the CM is unable to use that initialization technique, then the next one configured in the ordered list will be attempted, and so on. As one implementation example, if all initialization techniques configured in LoadBalGeneralGrpInitTechOrder have been attempted and the CM is still not successful in initializing with the DCC or DBC operation, then any untried initialization technique(s) that may have been configured in a standard DOCSIS MIB (e.g. docsLoadbal3GeneralGrpDefaultsInitTech) will then be attempted.

This control object is ignored if LoadBalGeneralGrpInitTechDynamicEnable is set to 'true'.

LoadBalGeneralGrpInitTechDynamicEnable MIB control object:

If set to 'true' this will enable the CMTS to determine the best DCC initialization techniques and their ordering based on information it has about various conditions and knowledge of the particular CM type. In addition, any setting of LoadBalGeneralGrpInitTechOrder (see above) will be ignored.

If set to 'false' this will result in the explicit/static ordering of DCC initialization techniques to be applied as described in LoadBalGeneralGrpInitTechOrder above).

Corresponding command line interface (CLI) commands may also be implemented to provide a user-friendly interface to the operator for setting the above MIB objects.

In an example scenario, consider a cable modem that is ranging then registers and passes traffic for a period of time on downstream channel DS_1 and upstream channel US_1. At regular intervals, the CMTS checks to see if load balancing operations need to take place. The CMTS identifies the CM as a candidate for load balancing movement from its current downstream and upstream channels to a new set of upstream and downstream channels (DS_2 and US_2).

In this example, assume the standard DOCSIS 3.0 MIB, docsLoadbal3GeneralGrpDefaultsInitTech, has already had the bit-field configured, and the bits set for docsLoadbal3GeneralGrpDefaultsInitTech is as follows:

reinitializeMac(bit 0)
broadcastInitRanging(bit 1)
unicastInitRanging(bit 2)
direct(bit 4)

As part of the disclosed concepts, these bits are interpreted as the initialization techniques to be considered as candidates for future DCC exchanges in conjunction with new MIB object, LoadBalGeneralGrpInitTechOrder as described below. The single bit that was not set (corresponding to initialization technique: initRanging(bit 3)) has a value of '0' in the docsLoadbal3GeneralGrpDefaultsInitTech bit-field.

The new MIB object LoadBalGeneralGrpInitTechOrder described above has been configured to explicitly set the following preferred order of initialization techniques to apply for DCC attempts. Note that the operator has not included the 'reinitializeMac' initialization technique in order to avoid the service disruption associated with resetting the CM.

1. Direct
2. UnicastInitRanging
3. BroadcastInitRanging
4. InitRanging

In addition, LoadBalGeneralGrpInitTechDynamicEnable has been set to 'false' which prevents the CMTS from automatically selecting the appropriate initialization techniques.

As shown in FIG. 2, the CMTS initiates a first DCC exchange with the CM. Using the new MIB object LoadBalGeneralGrpInitTechOrder, the first DCC exchange includes the CMTS directing a movement of the cable modem to the new set of channels and conveying the intended initialization technique 'Direct' as a Type-Length-Value (TLV) field in the DCC-REQ message. The 'direct' initialization technique was chosen since it was configured as the first in the LoadBalGeneralGrpInitTechOrder MIB object list above.

In this example, the CM agrees to the terms of the DCC Request with the specified initialization technique ('Direct') and takes steps to move to the specified channels.

After waiting an appropriate amount of time, the CMTS detects that the DCC move never took place. The CMTS then initiates a second DCC exchange, this time specifying the next initialization technique in the LoadBalGeneralGrpInitTechOrder MIB object ordered list: 'UnicastInitRanging'.

The CM agrees to the terms of the second DCC Request with the specified initialization technique ('UnicastInitRanging') and takes steps to move to the specified channels.

After waiting an appropriate amount of time, the CMTS detects that the DCC move never took place. The CMTS then initiates a third DCC exchange, this time specifying the next initialization technique in the LoadBalGeneralGrpInitTechOrder MIB object ordered list: 'BroadcastInitRanging'.

The CM agrees to the terms of the second DCC Request with the specified initialization technique ('BroadcastInitRanging') and takes steps to move to the specified channels.

This time, the move to the new set of DS and US channels takes place successfully and data is passed by the CM using the new channels. No immediate further load balancing DCC operations are necessary with this CM. Note that CMTS knowledge of a CM's successful DCC operation with a particular initialization technique may be stored for future use. For example, the success or failure of DCC attempts with the various initialization techniques may be stored for association with the particular CMs, and/or the types of CMs (manufacturer/model). In addition, the knowledge of this success/failure may also be used to show statistical information such as the number of CMs with success/failure for each initialization technique per MAC Domain or per downstream/upstream channel.

Also note that a benefit may be achieved in providing functionality of successive retries of load balancing DCC attempts specifying alternate initialization techniques. This new functionality may result in a larger pool of CMs being able to be load balanced with DCC than would have been possible using the existing DOCSIS operation.

In contrast to Example Scenario 1 above, consider another scenario in which the operator configures the control MIBs to exactly the same values, but in this example, assume the first DCC initialization technique attempted by the CMTS ('Direct') is successful in moving the CM to the new set of US and DS channels. The 'Direct' initialization technique is the least service disruptive to CMs compared with the other choices. Thus, in this example, the use of the selected technique prevented the CM from the brief loss of service that would have resulted from the operator choosing a different technique.

Although not described in detail here, other example scenarios could be constructed that involve the operator setting the LoadBalGeneralGrpInitTechDynamicEnable MIB control object to 'true,' thereby allowing the CMTS to decide the set (and order) of initialization techniques for load balancing DCC attempts with CMs. In embodiments, the CMTS may decide the initialization techniques and an order to try for a particular cable modem based on knowledge of the respective cable modem type.

For example, CMTS knowledge of which initialization technique(s) have resulted in successful DCC moves for CMs can be used for future advantage. That is, if a particular CM is known to have been successful in a DCC operation using a certain initialization technique, then this technique could be automatically chosen by the CMTS to use in subsequent DCC attempts with this CM (as well as possibly other CMs of the same model).

Figure 3:
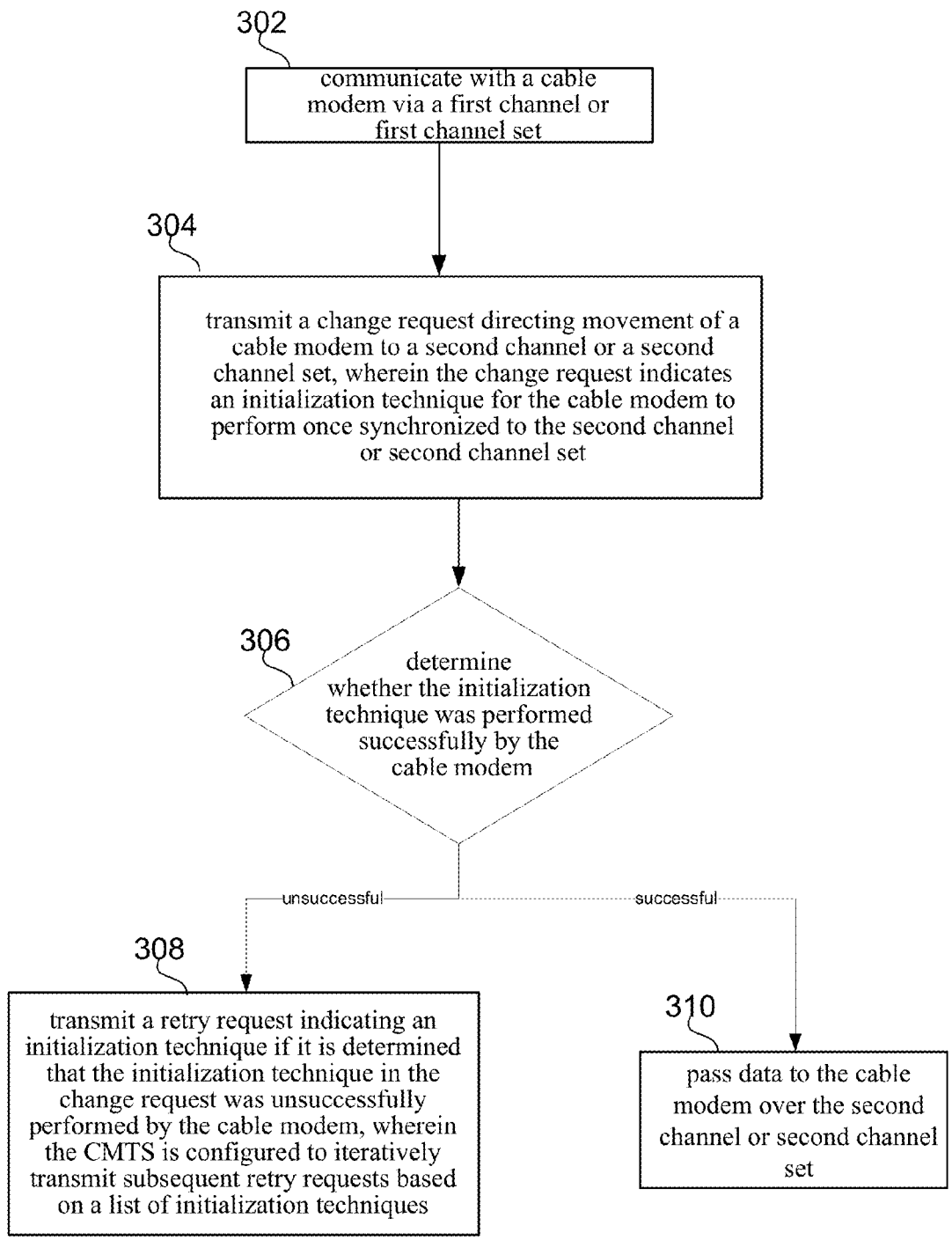
FIG. 3 depicts a flow diagram for the disclosed change request messaging exchange between a CMTS and CM.

FIG. 3 depicts a flow diagram for the disclosed change request messaging exchange between a CMTS and CM. As shown, at 302, the CMTS communicates with a cable modem via a first channel or a first channel set. At 304, the CMTS transmits a change request directing movement of a cable modem to a second channel or a second channel set, wherein the change request indicates an initialization technique for the cable modem to perform once synchronized to the second channel or the second channel set. At 306, the CMTS determines whether the initialization technique was performed successfully by the cable modem.

If it is determined at 306 that the initialization by the cable modem at the second channel or the second channel set by the indicated initialization technique is successful, the CMTS at 310 passes data to the cable modem over the second channel or the second channel set. If it is determined at 306 that the initialization by the cable modem at the second channel or the second channel set by the indicated initialization technique is unsuccessful, the CMTS transmits at 308 a retry request indicating an initialization technique, wherein the CMTS is configured to iteratively transmit subsequent retry requests based on a list of initialization techniques.

Figure 4:
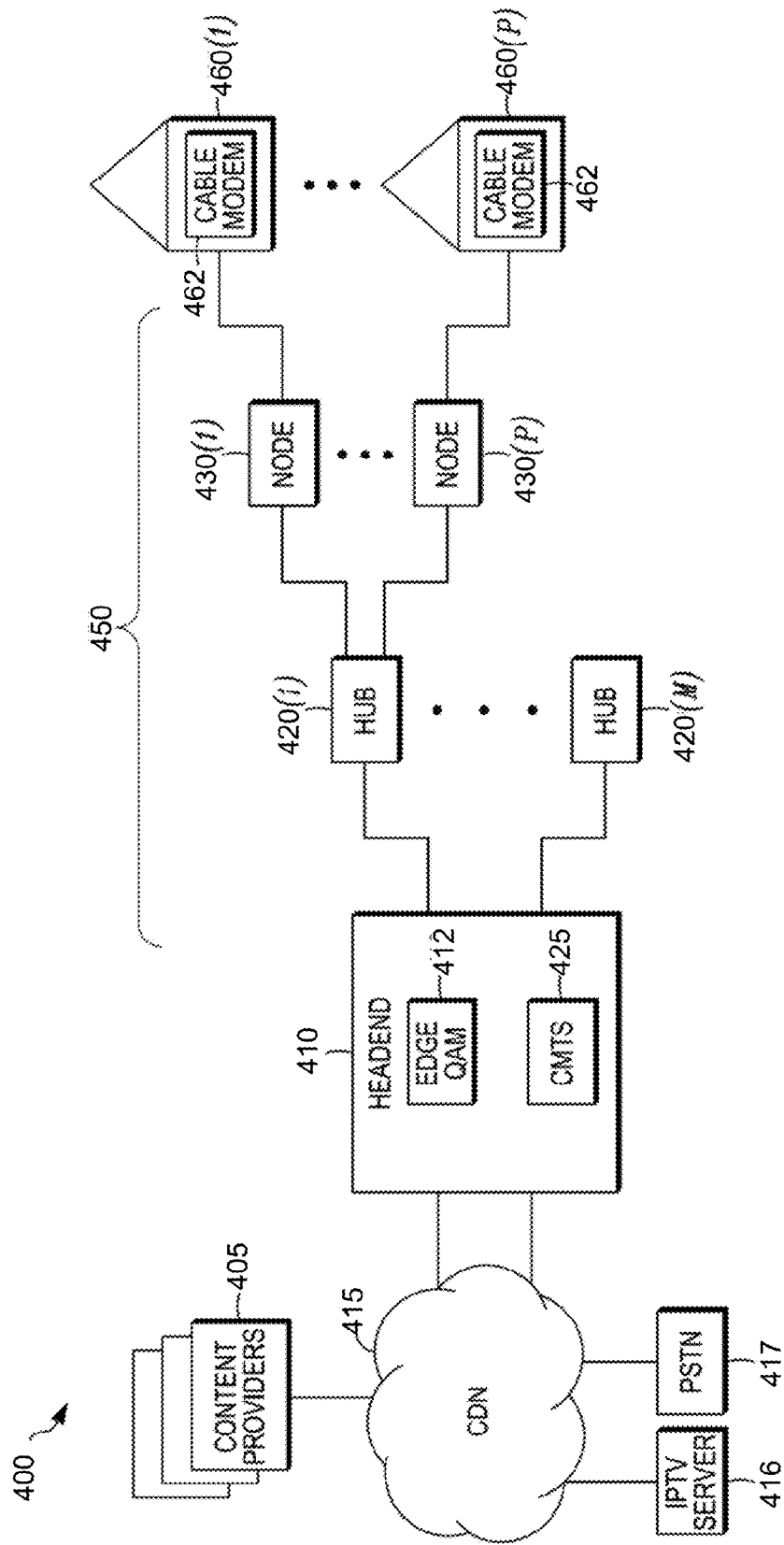
FIG. 4 illustrates an example cable system that may implement the disclosed techniques for optimizing load balancing and providing more efficient cable modem channel initialization techniques.

FIG. 4 illustrates an example cable system 400 that may implement the disclosed techniques for optimizing load balancing and providing more efficient cable modem channel initialization techniques. The system 400 includes a headend facility (HEF) 410, a plurality of hubs 420(1)-420(m), and associated with each hub, a plurality of nodes 430(1)-430(n) and a plurality of customers 460(1)-460(p). The HEF 410 or hubs 420 may have a cable modem termination system (CMTS). Each of the nodes 430 has one or more corresponding access points, and each of the customers 460 has one or more corresponding network elements 462, shown in FIG. 4 as a cable modem.

A single node 430 may be connected to hundreds of network elements. Described herein are techniques related to a cable modem network element 462; however it should be understood that the cable modem is used by way of example as the concepts apply to other network elements. Examples of network elements include cable modems (as shown in FIG. 4), set top boxes, televisions equipped with set top boxes, data over cable service interface specification (DOCSIS) terminal devices, media terminal adapters (MTA), and the like. Thus, where reference is made to a cable modem, the concepts also apply more broadly to a network element.

A cable system 400 provides one or more of commercial TV services, Internet data services, and voice services, e.g., Voice-over-Internet Protocol (VoIP) to one or more customer locations 460 (i.e., end users) in a given geographic area. To provide these services, the HEF 410 in the example cable system 400 in FIG. 4 is shown coupled via a content delivery network 415 to a plurality of content providers 405, an IPTV server 416, and a public switched telephone network (PSTN) 417.

The content delivery network 415 may be a cable data network such as an all-coaxial or a hybrid-fiber/coax (HFC) network. Of course, other broadband access networks such as xDSL (e.g., ADSL, ADLS2, ADSL2+, VDSL, and VDSL2) and satellite systems may also be employed. In embodiments, the content delivery network 415 comprises, for example, a packet-switched network that is capable of delivering IP packets from an IPTV Server 416 to clients 460(1)-460(p), using, for example, a cable data network, PON, or the like. Examples of a content delivery network 415 include networks comprising, for example, managed origin and edge servers or edge cache/streaming servers.

The content delivery servers 415 deliver content via one or more wired and/or wireless telecommunication networks to users 460(1)-460(p). In an illustrative example, content delivery network 415 comprises communication links 450 connecting each distribution node and/or content delivery server to one or more client devices, e.g., for exchanging data with and delivering content downstream to the connected client devices 460(1)-460(p). The communication links may include, for example, a transmission medium such as an optical fiber, a coaxial cable, or other suitable transmission media or wireless telecommunications.

FIG. 4 illustrates a hybrid fiber-coaxial (HFC) cable network system 400. A typical HFC network uses optical fiber for communications between the headend and the nodes and coaxial cable for communications between the nodes and the end user network elements. Downstream (also referred to as forward path) optical communications over the optical fiber are typically converted at the nodes to RF communications for transmission over the coaxial cable. Conversely, upstream (also referred to as return path) RF communications from the network elements are provided over the coaxial cables and are typically converted at the nodes to optical communications for transmission over the optical fiber. The return path optical link (the optical components in the HFC network, e.g. the transmission lasers, optical receivers, and optical fibers) contribute to the performance of the HFC network. In this HFC network example embodiment, the nodes 430 communicate via optical fibers with the hubs 420 and via coaxial cable to customer premises 460.

The HEF 410 and/or the hubs 420 may be coupled to the IPTV server 416 and PSTN 417 via CDN 415, e.g., the Internet, for providing Internet and telephony services (e.g., to and from customer 460(1)-460(p)) via the CMTS. The CMTS 425, in an embodiment, is a general-purpose computing device or application-specific integrated circuit (ASIC) that converts downstream digital data to a modulated RF signal, which is carried over the fiber and coaxial lines in the HFC network 450 to one or more customer locations 460. A communication interface may connect the CMTS 425 to the content delivery network 415 for routing traffic between the HFC network 450 and the internet network, the IP network 415, a PSTN, and/or the content providers 405. The various content providers, 405 for example, may be the source of media content (e.g., movies, television channels, etc.).

It should be noted that there are multiple embodiments of a CMTS architecture, such as a CMTS with an integrated physical (PHY) layer, a CMTS with a distributed PHY, or a Converged Cable Access Platform (CCAP) architecture in which the QAM is placed in an edge QAM. In FIG. 4, the edge QAM 412 is shown in the headend, but the edge QAM 412 may be located downstream from the CMTS 425. The CMTS 425 may host downstream and upstream ports and may use separate F connectors for downstream and for upstream communication for flexibility. In embodiments, a communication interface utilizing downstream channels 1-4 connects the CMTS 425 to a portion of the HFC network 450 for communicating over the HFC network 450.

By way of example, embodiments below describe a cable modem network element at the customer's premises for receipt of the modulated signals from the HEF and/or CMTS. A cable modem is a type of network bridge and modem that provides bi-directional data communication via radio frequency channels on a cable network, such as a hybrid fiber-coaxial plant (HFC) or RFoG infrastructure. For example, a cable modem can be added to or integrated with a set-top box that provides a TV set with channels for Internet access. Cable modems may deliver broadband Internet access in the form of cable Internet, taking advantage of the high bandwidth of an HFC or RFoG network. Cable modems can also deliver video services using Internet Protocol (IP). For example, the cable modem 462 may be connected to IPTV receivers or other items of CPE. A customer PC or laptop as well as other associated devices such as tablets, smartphones or home routers are termed customer premises equipment (CPE).

The network element, e.g., cable modem, 462 is connected through the network 450 to the CMTS 425. The cable modem converts signals received from the CMTS 425 carried over fiber and/or coaxial lines in the network. Cable modems 462 convert the digital data to a modulated RF signal for upstream transmission and convert downstream RF signal to digital form. Thus, the conversion is done at a subscriber's facility. The cable modem 462 demodulates the downstream RF signal and feeds the digital data to a CPE or an IPTV, for example. On the return path, digital data is fed to the cable modem (from an associated PC in the CPE, for example), which converts it to a modulated RF signal. Once the CMTS 425 receives the upstream RF signal, it demodulates it and transmits the digital data to its eventual destination. Cable modems 462 are therefore useful in transforming the cable system into a provider of video, voice and data telecommunications services to users.

The cable network 400 may implement the disclosed load balancing techniques using a Data Over Cable Service Interface Specification (DOCSIS) protocol. DOCSIS is an international telecommunications standard that permits the addition of high speed data transfer to an existing cable television (CATV) network, such as cable network 400. The DOCSIS protocol is the protocol used to send digital video and data between a hub or headend facility and cable modem. DOCSIS is used to convey Internet or other packet based networking information, as well as packetized digital video between CMTSs and CMs. DOCSIS is employed by many cable operators to provide Internet access over their existing network infrastructures, e.g., hybrid fiber-coaxial (HFC) infrastructure, PON architectures, etc. While embodiments are disclosed with reference to DOCSIS, the load balancing implementations may apply to other networks or systems.

A typical DOCSIS architecture includes a cable modem (CM) located at the customer premises, and a cable modem termination system (CMTS) located at the CATV headend, as in the example cable network 400 depicted in FIG. 4. In an embodiment, a memory in the headend, such a memory of the CMTS 430 or edge device, may include a DOCSIS program that implements the DOCSIS specification.

DOCSIS provides a variety in options available at Open Systems Interconnection (OSI) layers 1 and 2, the physical layer, and the data link layer. A DOCSIS physical layer may include the basic networking hardware transmission technologies of a network. A DOCSIS physical layer defines the means of transmitting raw bits rather than logical data packets over a physical link connecting network nodes. The bit stream may be grouped into code words or symbols and converted to a physical signal that is transmitted over a hardware transmission medium. The modulation scheme to use and similar low-level parameters are defined by the DOCSIS scheme.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

As described with respect to FIG. 4, a communication interface may connect the edge device 440 to the IP network 420 and HFC network 450. A bus is a communication medium that may connect a processor, e.g., CMTS processor, a data storage device, communication interface, DOCSIS external physical interface (DEPI), and memory (such as Random Access Memory (RAM), Dynamic RAM (DRAM), non-volatile computer memory, flash memory, or the like). In embodiments the communication interface utilizes downstream channels (e.g., channels 5-8) to communicate with the HFC network 450. The DEPI may connect the edge device 440 to the CMTS 430. In embodiments, on the edge device 440 is an application-specific integrated circuit (ASIC).

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In an embodiment, a computer-readable storage medium has stored thereon instructions that, when executed, cause a processor to communicate with a cable modem via a first channel or a first channel set; transmit, from a cable modem termination system (CMTS), a change request directing movement of a cable modem to a second channel or a second channel set, wherein the change request indicates an initialization technique for the cable modem to perform once synchronized to the second channel or the second channel set; determine whether the initialization technique was performed successfully by the cable modem; and transmit a retry request indicating an initialization technique if it is determined that the initialization technique in the change request was unsuccessfully performed by the cable modem, wherein the CMTS is configured to iteratively transmit subsequent retry requests based on a list of initialization techniques.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

We claim:

1. A method based on a Data Over Cable Service Interface Specification (DOCSIS) protocol access system for load balancing in a cable network, the method comprising:
   communicating with a cable modem via a first channel or first channel set;
   determining, at a cable modem termination system (CMTS), whether an implementation-specific DOCSIS Management Information Base (MIB) control object is available for the cable modem for dynamically identifying one or more initialization techniques corresponding to a movement of the cable modem from the first channel or first channel set; else the CMTS accessing a standard DOCSIS MIB control object having a static ordering of initialization techniques;
   selecting an initialization technique from the implementation-specific DOCSIS MIB if available; else selecting an initialization technique from the standard DOCSIS MIB;
   transmitting, from the CMTS, a change request directing movement of the cable modem to a second channel or a second channel set, wherein the change request indicates the selected initialization technique for the cable modem to perform once synchronized to the second channel or the second channel set;
   determining whether the initialization technique was performed successfully by the cable modem; and
   transmitting a retry request indicating an initialization technique if determined that the initialization technique in the change request was unsuccessfully performed by the cable modem, wherein the CMTS is configured to iteratively transmit subsequent retry requests including either untried initialization techniques or retrying unsuccessful initialization techniques based on a list of initialization techniques in one or more of the DOCSIS MIBs.

2. The method of claim 1, wherein the list of initialization techniques is a list based on a predefined ordering of initialization techniques.

3. The method of claim 2, wherein the subsequent retry requests each include an initialization technique selected progressively from the list based on the predefined ordering, and subsequent retry requests are iteratively transmitted until an indicated initialization technique is performed successfully.

4. The method of claim 1, wherein upon an indication that the cable modem successfully performs an indicated initialization technique, passing data to the cable modem over the second channel or the second channel set.

5. The method of claim 1, wherein a successful or unsuccessful initialization technique indicated is stored for future use.

6. The method of claim 1, wherein each subsequent retry request includes a different or the same initialization technique as sent in an initial change request.

7. The method of claim 1, wherein the list is in an order starting with a least disruptive initialization technique to a more service disruptive initialization technique.

8. The method of claim 1, wherein a Management Information Base (MIB) object is defined extending a choice of initialization techniques for use in the subsequent retry requests.

9. The method of claim 8, wherein the MIB is statically configured by an operator or determined dynamically at the CMTS.

10. The method of claim 9, wherein, for each change request or retry attempt, the MIB object allows at least one of:
    an operator to define an explicit ordering of the initialization techniques, or
    the CMTS to automatically determine and define an ordering of initialization techniques.

11. The method of claim 1, wherein determining whether the initialization technique was performed successfully at the cable modem is based on at least one of:
    a message from the cable modem indicating failure or reject from cable modem (CM) or
    a lapse in response from the cable modem.

12. The method of claim 1, wherein the change request is at least one of a dynamic channel change (DCC) or a dynamic bonding change (DBC) request.

13. A cable modem termination system (CMTS) for load balancing cable modems in a cable network, the CMTS comprising:
    a communication interface for communicating with a cable modem via a first channel or a first channel set from a plurality of channels;
    a CMTS processor configured for:
      determining whether an implementation-specific DOCSIS Management Information Base (MIB) control object is available for the cable modem that dynamically identifies one or more initialization techniques corresponding to a movement of the cable modem from the first channel or first channel set; else accessing a standard DOCSIS MIB control object having a static ordering of initialization techniques;

selecting an initialization technique from the implementation-specific DOCSIS MIB if available; else selecting an initialization technique from the standard DOCSIS MIB;

transmitting, via the communication interface, a change request directing movement of the cable modem to a second channel or a second channel set in the plurality of channels, wherein the change request indicates an initialization technique for the cable modem to perform once synchronized to the second channel or the second channel set, determining whether the initialization technique was performed successfully by the cable modem, and transmitting, via the communication interface, a retry request indicating an initialization technique if it is determined that the initialization technique in the change request was unsuccessfully performed by the cable modem, wherein the CMTS is configured to iteratively transmit subsequent retry requests including either untried initialization techniques or retrying unsuccessful initialization techniques based on a list of initialization techniques in one or more of the DOCSIS MIBs.

14. The system of claim 13, wherein the list of initialization techniques is a list based on a predefined ordering of initialization techniques.

15. The system of claim 14, wherein the subsequent retry requests each include an initialization technique selected progressively from a predefined list, and subsequent retry requests are iteratively transmitted until an indicated initialization technique is performed successfully.

16. The system of claim 13, wherein a successful or unsuccessful initialization technique indicated is stored for future use.

17. The system of claim 13, wherein a Management Information Base (MIB) object is defined extending a choice of initialization techniques for use in the subsequent retry requests.

18. The system of claim 17, wherein the MIB is statically configured by an operator or determined dynamically at the CMTS.

19. The system of claim 13, wherein the change request is at least one of a dynamic channel change (DCC) or a dynamic bonding change (DBC) request.

20. A method based on a Data Over Cable Service Interface Specification (DOCSIS) protocol access system for load balancing in a cable network, the method comprising:

communicating with the cable network via a first channel or a first channel set;

receiving a change request directing movement of a cable modem to a second channel or a second channel set, the change request indicating an initialization technique for the cable modem to perform once synchronized to the second channel or the second channel set, wherein the initialization technique indicated in the change request is selected by a cable modem termination system (CMTS) from at least one of: a) an implementation-specific DOCSIS Management Information Base (MIB) control object dynamically identifying initialization techniques corresponding to the movement of the cable modem from the first channel or first set or b) a standard DOCSIS MIB control object having a static ordering of initialization techniques;

synchronizing the cable modem to the second channel or the second channel set;

attempting to initialize the cable modem on the second channel or the second channel set using the initialization technique selected from either the implementation-specific DOCSIS MIB control object or the standard DOCSIS MIB control object;

transmitting an indicator to the CMTS that the initialization technique was unsuccessful and initialization on the second channel or the second channel set by the cable modem has failed;

receiving a retry request indicating an untried initialization technique or a previously unsuccessful initialization techniques from a list of initialization techniques in one or more of the DOCSIS MIBs, wherein the cable modem is configured for receiving retry requests iteratively transmitted by the CTMS; and attempting to initialize the cable modem on the second channel or the second channel set according to the initialization technique in the retry request or in a subsequent retry request, wherein the cable modem is configured for receiving retry requests iteratively transmitted by the CMTS and attempting initialization of the cable modem until initialization on the second channel or the second channel set is successful.

* * * * *